United States Patent
Ishikawa

[11] Patent Number: 6,119,601
[45] Date of Patent: Sep. 19, 2000

[54] TRANSPORT APPARATUS

[75] Inventor: Shinji Ishikawa, Osaka, Japan

[73] Assignee: Nakanishi Metal Works, Co., Ltd., Osaka, Japan

[21] Appl. No.: 08/964,344

[22] Filed: Nov. 4, 1997

[30] Foreign Application Priority Data

Nov. 5, 1996 [JP] Japan .................................. 8-292930

[51] Int. Cl.$^7$ .................................................. B61B 13/00
[52] U.S. Cl. ...................................... 104/165; 104/172.5
[58] Field of Search ............................ 104/165, 172.1, 104/172.3, 172.5

[56] References Cited

U.S. PATENT DOCUMENTS

| 2,715,369 | 8/1955 | Doehler | 104/165 |
| 3,010,410 | 11/1961 | Daniels | 104/165 |
| 3,768,624 | 10/1973 | Kornylak | 104/165 |
| 4,261,458 | 4/1981 | Bosman | 104/165 |
| 4,305,335 | 12/1981 | Plugge | 104/172.3 |
| 5,195,630 | 3/1993 | Donovan et al. | 104/172.3 |

FOREIGN PATENT DOCUMENTS

| 73444 | 7/1960 | France | 104/165 |
| 554623 | 7/1932 | Germany | 104/165 |
| 57-37910 | 2/1982 | Japan . | |
| 60-89083 | 6/1985 | Japan . | |

Primary Examiner—S. Joseph Morano
Attorney, Agent, or Firm—Armstong, Westerman, Hattori, McLeland & Naughton

[57] ABSTRACT

A transport apparatus comprises two rails 14, 17 arranged side by side for supporting respective right and left metal wheels 21, 22 of a truck 18 thereon. At least one of the two rails 14, 17 is a truck transport movable rail 17 movable longitudinally thereof. A portion of the entire movable rail 17 including at least a rail tread is made of an elastic material.

4 Claims, 5 Drawing Sheets

TRANSPORT APPARATUS

BACKGROUND OF THE INVENTION

The present invention relates to transport apparatus, and more particularly to a transport apparatus which is useful, for example, in motor vehicle manufacturing plants for transporting trucks with a vehicle body placed thereon along a specified path and which is adapted to stop the truck at a desired position during transport.

As disclosed, for example, in Unexamined Japanese Utility Model Publication No. 89083/1985, apparatus of the type mentioned are already known which comprise two rails arranged side by side for supporting respective right and left metal wheels of a truck thereon, at least one of the two rails being a truck transport movable rail movable longitudinally thereof. The movable rail is made of a metal material in its entirety.

Since the wheel and the rail of the conventional apparatus are both made of metal, they are in line contact with each other when considered to be substantially undeformable elastically. Accordingly, the rolling friction between the wheel and the rail is extremely small, permitting the wheel to roll on the rail relatively easily. Even if it is attempted to transport the truck along with the rail by moving the rail, there is a strong tendency for the truck to remain unmoved owing to the inertial force of the truck, with the result that only the rail moves, failing to transport the truck reliably.

Another apparatus is known which has a movable rail the tread of which is formed with a wheel engaging recessed portion as disclosed, for example, in Unexamined Japanese Utility Model Publication No. 37910/1982.

When the rail of this apparatus is moved with a truck held at a halt, the engaging recessed portion of the moving rail gives a shock or produces noise every time the wheel is engaged in or released from the recessed portion, so that the rail is not movable smoothly.

SUMMARY OF THE INVENTION

An object of the present invention is to overcome the foregoing problems and to provide a transport apparatus which is adapted to transport trucks reliably.

The present invention provides a transport apparatus which comprises a transport apparatus comprising two rails arranged side by side for supporting respective right and left metal wheels of a truck thereon, at least one of the two rails being a truck transport movable rail movable longitudinally thereof, the transport apparatus being characterized in that a portion of the entire movable rail including at least a rail tread is made of an elastic material.

With the transport apparatus of the invention, a portion of the entire movable rail which portion includes at least the rail tread is made of an elastic material. The wheel therefore elastically deforms the rail to bite in under the gravity acting on the truck, and is in face-to-face contact with the tail. This results in increased rolling friction between the wheel and the rail, rendering the wheel difficult to roll on the rail and permitting the truck to move with the rail when the rail is moved. Consequently, the truck can be transported reliably with the movement of the rail.

Preferably, the movable rail comprises a plurality of blocks facing outward and attached to an endless chain movable in circulation in a vertical plane so as to be in contact with one another, each of the blocks comprising a metal base plate and a block main body made of rubber and bonded to a surface of the base plate.

The movable rail is thus relatively simple in construction and made movable readily. The block can be manufactured by mass production at a low cost.

Preferably, the blocks include different kinds of blocks which are different in height, and the different kinds of blocks are arranged alternately or in alternate sets of at least two blocks of same kind.

This arrangement creates stepped portions in the tread of the movable rail which restrain the wheel from rolling, consequently permitting the truck to follow the movement of the rail with greater ease.

The movable rail may be formed in its tread with a recess and/or a protrusion. Such recessed or protruding portions also act to restrain the wheel from rolling.

DESCRIPTION OF THE PREFERRED EMBODIMENTS

Embodiments of the invention will be described below with reference to the drawings.

Figure 1:
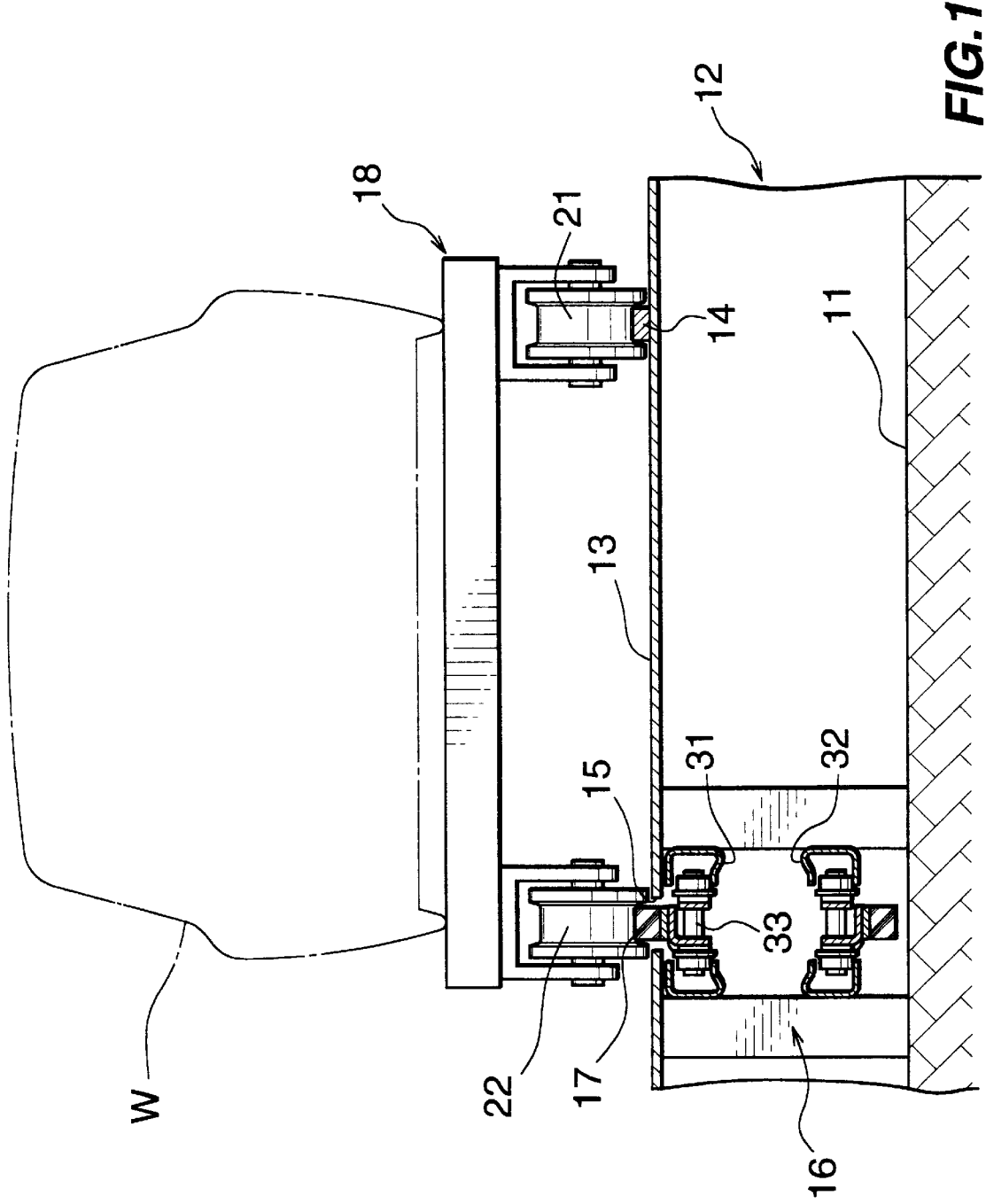
FIG. 1 is a view in cross section of a transport apparatus embodying the invention.

Referring to FIG. 1, a work base 12 is installed on a floor 11. The work base 12 has a top plate 13 which is provided with a fixed rail 14 extending from the front rearward and which is formed with a slit 15 positioned at the right of the fixed rail 14 and extending in parallel thereto. Installed between the floor 11 and the top plate 13 is a conveyor 16 providing an endless movable rail 17, with an upper transport path thereof inserted in the slit 15. A truck 18 is supported by the fixed rail 14 and the movable rail 17 with a vehicle body W placed on the truck 18. The truck 18 has two right wheels 21 supported by the fixed rail 14, and two left wheels 22 supported by the movable rail 17. The wheels 21, 22 are all made of steel.

The conveyor 16 comprises a pair of upper support frames 31 channel-shaped in cross section and having their openings opposed to each other, a pair of lower support frames 32 shaped and arranged similarly, and an endless chain 33 movable along the upper and lower support frames 31, 32 in circulation in a vertical plane.

Figure 2:
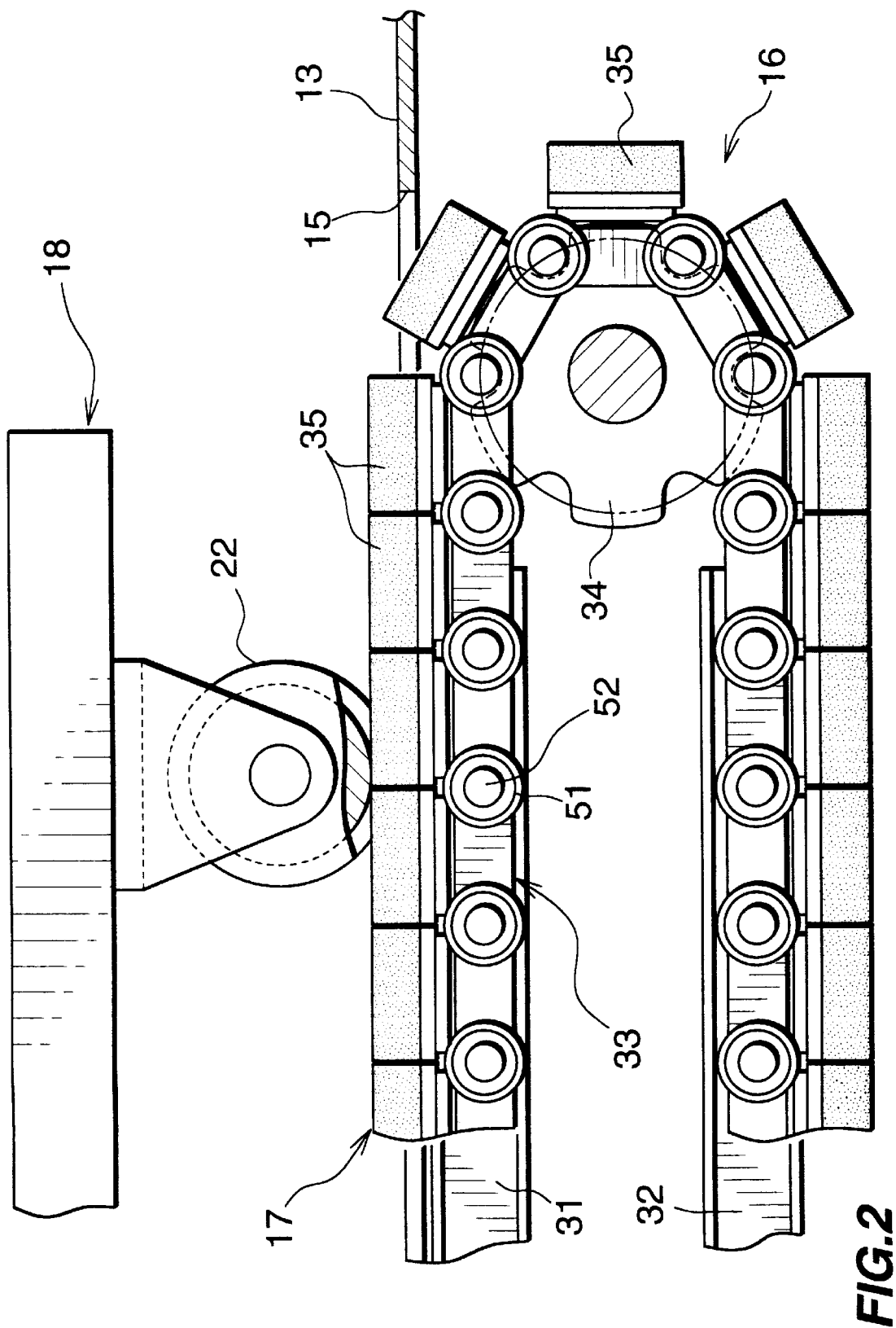
FIG. 2 is a side elevation of the apparatus.

With reference to FIG. 2, a sprocket 34 is disposed to the rear of the upper and lower support frames 31, 32, and the chain 33 is reeved around the sprocket.

The chain 33 has attached thereto a multiplicity of blocks 35 facing outward and arranged in succession. The movable rail 17 is provided by these blocks 33 thus arranged in series.

Figure 3:
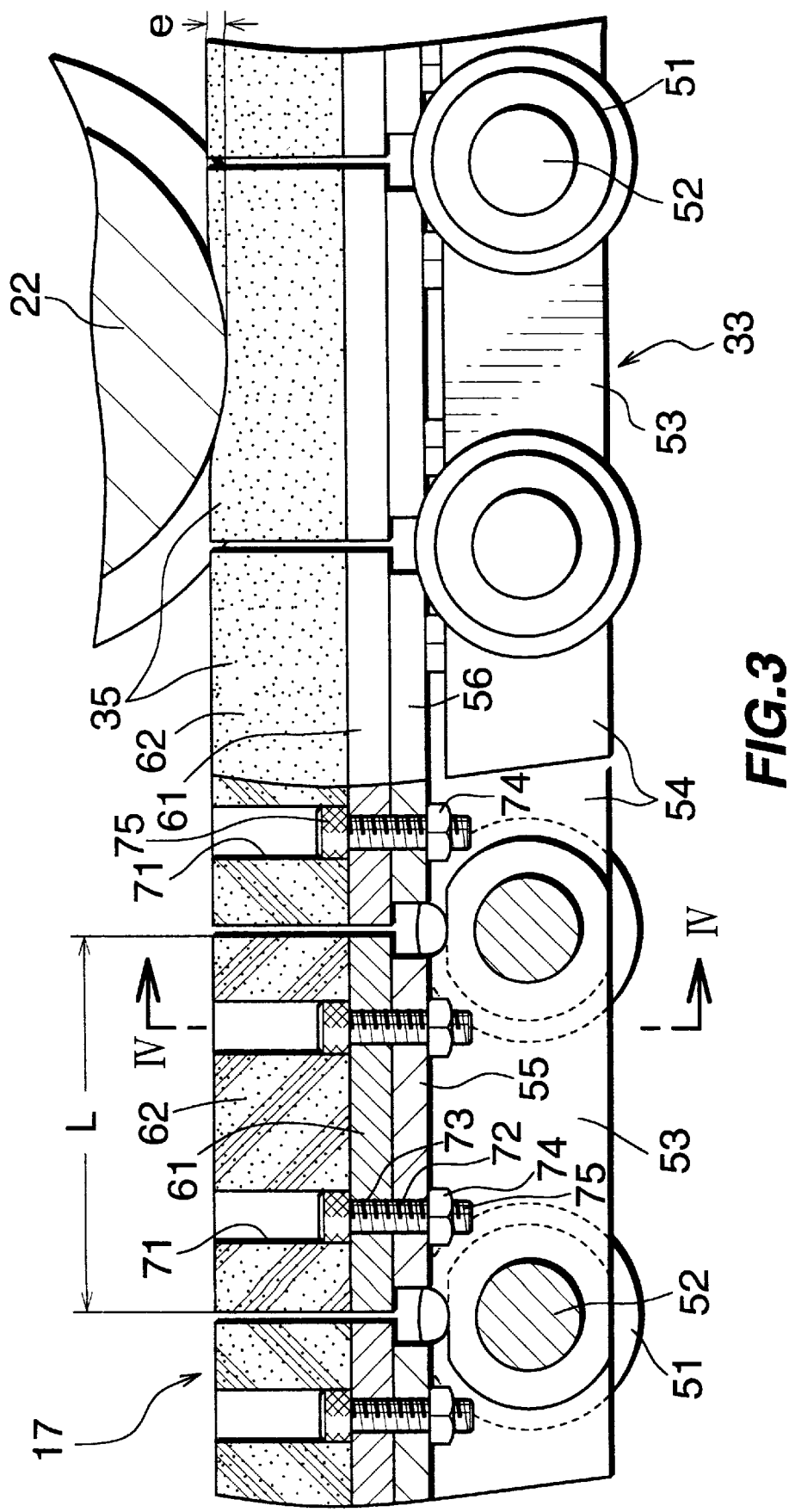
FIG. 3 is a side elevation showing a portion of FIG. 2 on an enlarged scale.
Figure 4:
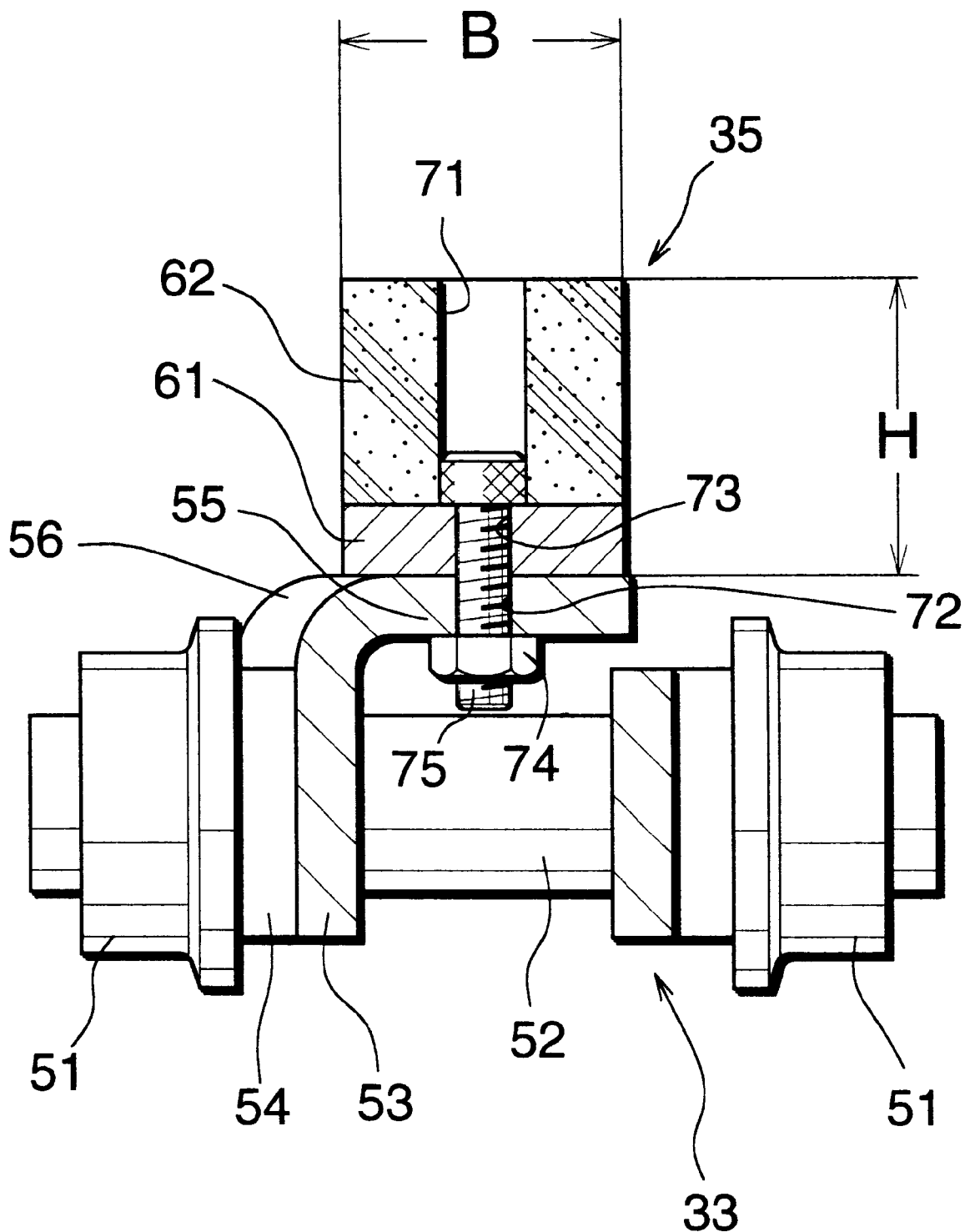
FIG. 4 is a view in section taken along the line IV—IV in FIG. 3.

As shown in greater detail in FIGS. 3 and 4, the chain 33 comprises side rollers 51 positioned inside of and rollable along the upper and lower support frames 31, 32, roller axles 52 each carrying one pair of side rollers 51 at opposite ends thereof, and inner links 53 and outer links 54 arranged alternately at each of the left and right sides and each interconnecting one pair of adjacent axles 52.

The inner link 53 and the outer link 54 at the left side are integral with respective extensions 55, 56 each in the form of a horizontal rectangular plate projecting rightward from the upper edge of the link. One block 35 is mounted on the upper side of the extension.

The block 35 comprises a rectangular steel base plate 61 approximately identical with the extension 55 or 56 in shape, and a rectangular parallelepipedal block main body 62 made of rubber and bonded to an outer surface of the base plate 61 by vulcanization and heating.

The block main body 62 has two bolt holes 71 extending vertically therethrough. The extension 55 or 56 and the base plate 61 have respective clearance holes 72, 73 in register with each of the bolt holes 71. A socket head bolt 75 has a threaded shank, which is inserted through each bolt hole 71 with the outer end of the shank projecting downward from the clearance hole 72, and a nut 74 is screwed on the projecting end, whereby the block 35 is attached to the extension 55 or 56.

The present apparatus as actually built was tested as will be described below specifically with numerical data given.

The vehicle body W and the truck 18 were 500 kg and 300 kg, respectively, in weight, hence 800 kg in total weight. The body and the truck were supported by the four wheels 21, 22, each 140 mm in diameter.

The rubber material, which can be suitably selected from among synthetic rubbers, was urethane rubber in view of wear resistance and strength. The rubber was 90 to 95 deg in hardness. The blocks 35 were 15 mm, 32 mm and 84 mm in width B, height H and length L, respectively (FIGS. 3 and 4).

When the truck 18 carrying the vehicle body W was supported with its right wheels 21 placed on the fixed rail 14 and its left wheels 22 on the movable rail 17, the left wheels 22 bit into the movable rail 17, elastically deforming the rail tread to a circular-arc form. The maximum depth e of the deformed tread portion of the movable rail from the normal tread was 4 to 5 mm (FIG. 3).

The conveyor 16 was then operated to move the movable rail 17 at a speed of 10 m/min, whereby the truck 18 was moved along with the movable rail 17 without permitting the rotation of the left wheels 22 on the movable rail 17 although the right wheels 21 rotated on the fixed rail 14. The tractive force of the movable rail 17 on the truck 18 was approximately 3 kg.

Figure 5:
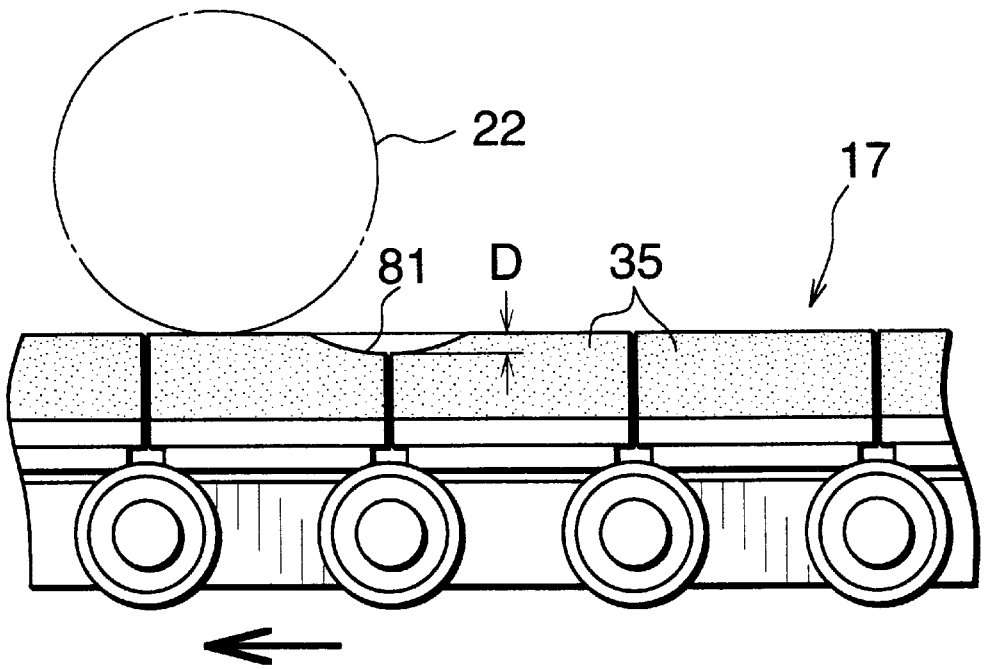
FIG. 5 is a side elevation showing modification of blocks.

With reference to FIG. 5, the illustrated rail tread provided by blocks 35 is formed with a cutout 81 which is circular-arc when seen from one side. Two adjacent blocks 35 are cut out to provide the cutout 81.

When the wheel 22 engages in the cutout 81, the tractive force of the movable rail 17 on the truck of course increases. The size of the cutout 81 is so adjusted as to give the desired tractive force.

When the modified apparatus was tested under the same conditions as above with the cutout 81 adjusted to a depth D of 3 mm, the truck 18 followed the movable rail 17 free of any trouble even when the rail 17 was moved at a speed of 16 m/min.

Figure 6:
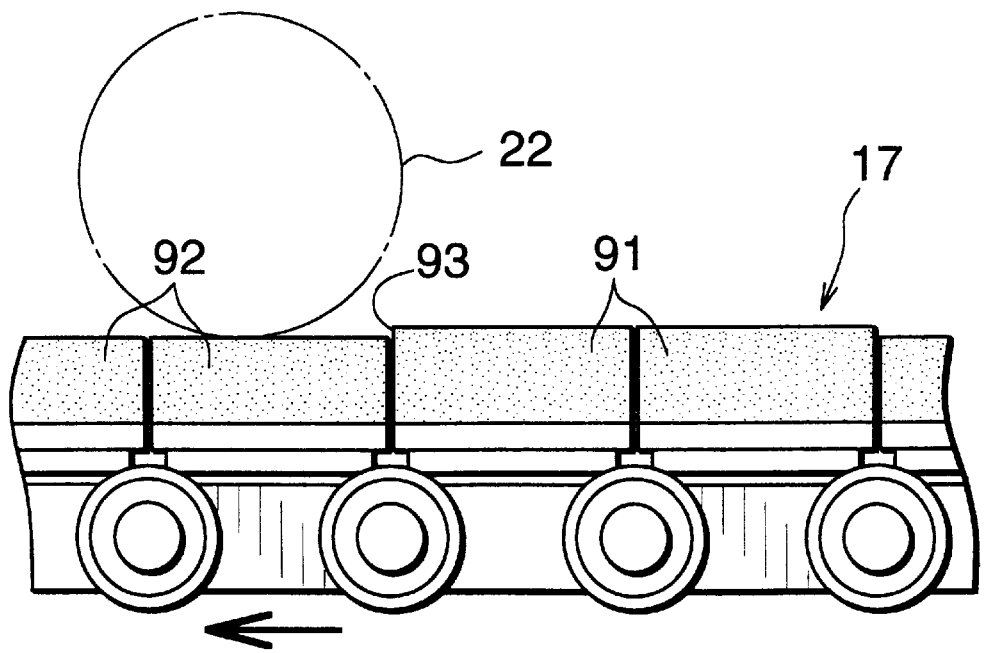
FIG. 6 is a side elevation showing another modification of blocks.

FIG. 6 shows two kinds of blocks 91, 92 which are different in height. With this modification, two kinds of blocks 91, 92 are arranged in alternate sets of two blocks of the same kind. A stepped portion 93 is created at the junction of the two adjacent blocks 91, 92 which are different in height. The resistance encountered when the wheel 22 moves over the stepped portion 93 affords an increased tractive force to pull the truck. The size of the stepped portion 93 is adjusted as in the case of the cutout 81.

What is claimed is:

1. A transport apparatus, comprising:

a truck having right and left metal wheels; and two rails arranged side by side for supporting said wheels thereon;

wherein at least one of said two rails is a truck transport movable rail movable longitudinally thereof, wherein an upper portion of said truck transport movable rail including at least a rail tread on which one of said wheels contacts is made of an elastic material which elastically deforms by said one of said wheels to increase a rolling friction between said one of said wheels and said truck transport movable rail, whereby said truck is moved along with said truck transport movable rail without permitting a rotation of said one of said wheels because of an increased rolling friction between said one of said wheels and said truck transport movable rail, wherein said truck transport movable rail comprises a plurality of blocks facing outward and attached to an endless chain movable in circulation in a vertical plane so as to be in contact with one another, each of said blocks comprising a metal base plate and a block main body made of rubber and bonded to a surface of said base plate, and wherein said blocks include different kinds of blocks which are different in height, and said different kinds of blocks are arranged alternately or in alternate sets of at least two blocks of same kind.

2. A transport apparatus, comprising:

a truck having right and left metal wheels; and two rails arranged side by side for supporting said wheels thereon;

wherein at least one of said two rails is a truck transport movable rail movable longitudinally thereof, wherein an upper portion of said truck transport movable rail including at least a rail tread on which one of said wheels contacts is made of an elastic material which elastically deforms by said one of said wheels to increase a rolling friction between said one of said wheels and said truck transport movable rail, whereby said truck is moved along with said truck transport movable rail without permitting a rotation of said one of said wheels because of an increased rolling friction between said one of said wheels and said truck transport movable rail, wherein said truck transport movable rail comprises a plurality of blocks facing outward and attached to an endless chain movable in circulation in a vertical plane so as to be in contact with one another, each of said blocks comprising a metal base plate and a block main body made of rubber and bonded to a surface of said base plate, wherein said blocks include different kinds of blocks which are different in height, and said different kinds of blocks are arranged alternately or in alternate sets of at least two blocks of same kind, and wherein said rail tread of said truck transport movable rail is formed with a recess and/or a protrusion.

3. A transport apparatus, comprising:

a truck having right and left metal wheels: and two rails arranged side by side for supporting said metal wheels of a truck thereon, at least one of said two rails being a truck transport movable rail movable longitudinally thereof, wherein a portion of the entire truck transport movable rail including at least a rail tread is made of an elastic material, wherein said truck transport movable rail comprises a plurality of blocks facing outward and attached to an endless chain movable in circulation in a vertical plane so as to be in contact with one another, each of said blocks comprising a metal base plate and a block main body made of rubber and bonded to a surface of said base plate, and wherein said blocks include different kinds of blocks which are different in height, and the different kinds of blocks are arranged alternately or in alternate sets of at least two blocks of same kind.

4. The transport apparatus according to claim 3, wherein said rail tread of said truck transport movable rail is formed with a recess and/or a protrusion.

* * * * *